US010455185B2

(12) United States Patent
Bostick et al.

(10) Patent No.: US 10,455,185 B2
(45) Date of Patent: Oct. 22, 2019

(54) DETECTING ANOMALOUS EVENTS TO TRIGGER THE UPLOADING OF VIDEO TO A VIDEO STORAGE SERVER

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 15/233,314

(22) Filed: Aug. 10, 2016

(65) Prior Publication Data

US 2018/0048850 A1 Feb. 15, 2018

(51) Int. Cl.
*H04N 5/77* (2006.01)
*G06K 9/00* (2006.01)
(Continued)

(52) U.S. Cl.
CPC ........... *H04N 5/77* (2013.01); *G06K 9/00791* (2013.01); *H04N 7/181* (2013.01); *H04N 7/188* (2013.01); *H04N 7/162* (2013.01)

(58) Field of Classification Search
CPC ...................................................... H04N 5/77
See application file for complete search history.

(56) References Cited

U.S. PATENT DOCUMENTS

| 8,768,142 B1 | 7/2014 | Ju et al. | |
| 2011/0044536 A1* | 2/2011 | Cobb | ....................... G06K 9/46 |
| | | | 382/165 |

(Continued)

FOREIGN PATENT DOCUMENTS

| CN | 105205881 | 12/2015 |
| WO | 2015013315 | 1/2015 |
| WO | 2015050413 | 4/2015 |

OTHER PUBLICATIONS

Mell et al., "The NIST Definition of Cloud Computing", NIST, Special Publication 800-145, Sep. 2011, 7 pages.

(Continued)

*Primary Examiner* — Rowina J Cattungal
(74) *Attorney, Agent, or Firm* — Christopher K. McLane; Andrew D. Wright; Roberts Mlotkowski Safran Cole & Calderon, P.C.

(57) ABSTRACT

A computer-implemented method includes: monitoring, by a computing device, video or image data captured by a plurality of cameras implemented within a vehicle; monitoring, by the computing device, vehicle information associated with the vehicle, wherein the vehicle information includes sensor information reported by tire pressure sensors or impact sensors of the vehicle, or vehicle diagnostic information; detecting, by the computing device, satisfaction of particular video upload event criteria for which video should be uploaded for secure storage and future analysis, wherein the detecting the satisfaction of the video upload criteria is based on the monitoring the video or image data and the vehicle information; and uploading, by the computing device, video captured by a subset of the plurality of cameras to a video storage server, wherein the subset of the plurality of cameras include cameras capture the video or image data used to detect the satisfaction of the video upload (Continued)

event criteria or are associated with the vehicle information used to detect the satisfaction of the video upload event criteria.

20 Claims, 6 Drawing Sheets

(51) Int. Cl.
  *H04N 7/18* (2006.01)
  *H04N 7/16* (2011.01)

(56) References Cited

U.S. PATENT DOCUMENTS

| | | | |
|---|---|---|---|
| 2014/0285337 A1 | 9/2014 | Gebhardt | |
| 2016/0021492 A1* | 1/2016 | Carlsson | H04W 4/02 |
| | | | 455/456.3 |
| 2016/0192312 A1* | 6/2016 | Lambert | H04W 48/18 |
| | | | 455/435.2 |
| 2017/0113664 A1* | 4/2017 | Nix | B60T 7/12 |
| 2017/0330397 A1* | 11/2017 | Palmer | B60R 1/00 |

OTHER PUBLICATIONS

Siegchrist, "Share and Store Video with iCloud: Apple's Cloud Storage Solution", http://desktopvideo.about.com/od/downloadingvideo/p/Share-And-Store-Video-With-Icloud-Apples-Cloud-Storage-Solution.htm, Jul. 28, 2016, 3 Pages.

Yeh et al., "Vision-Based Vehicle Event Detection Through Visual Rhythm Analysis", IEEE 2008, 4 pages.

IBM, "A System and Method for Multi-Sensor Vehicle Recognition", Jun. 9, 2008, 5 pages.

"New Google patent suggests automatically sending your videos and photos to law enforcement", http://www.pogowasright.org/new-google-patent-suggests-automatically-sending-your-videos-and-photos-to-law-enforcement/, PoGoWasRight.Org, Jan. 31, 2014, 3 pages.

List of IBM Patents or Patent Applications Treated as Related dated Aug. 27, 2019, 1 page.

Specification "Detecting Anomalous Events to Trigger the Uploading of Video to a Video Storage Server" and Drawings in related U.S. Appl. No. 16/552,122, filed Aug. 27, 2019, 43 pages.

* cited by examiner

DETECTING ANOMALOUS EVENTS TO TRIGGER THE UPLOADING OF VIDEO TO A VIDEO STORAGE SERVER

BACKGROUND

The present invention generally relates to uploading video to a video storage server and, more particularly, to detecting events that trigger the uploading of video to a video storage server.

Vehicles may include a group of cameras arranged in a manner to capture full 360-degree video of the vehicle's surroundings. Video of the vehicle's surrounds can be useful for various applications, for example, for identifying road hazards, driving habits or actions of the vehicle or surrounding vehicles, traffic light status during vehicle travel, etc.

SUMMARY

In an aspect of the invention, a computer-implemented method includes: monitoring, by a computing device, video or image data captured by a plurality of cameras implemented within a vehicle; monitoring, by the computing device, vehicle information associated with the vehicle, wherein the vehicle information includes sensor information reported by tire pressure sensors or impact sensors of the vehicle, or vehicle diagnostic information; detecting, by the computing device, satisfaction of particular video upload event criteria for which video should be uploaded for secure storage and future analysis, wherein the detecting the satisfaction of the video upload criteria is based on the monitoring the video or image data and the vehicle information; and uploading, by the computing device, video captured by a subset of the plurality of cameras to a video storage server, wherein the subset of the plurality of cameras include cameras capture the video or image data used to detect the satisfaction of the video upload event criteria or are associated with the vehicle information used to detect the satisfaction of the video upload event criteria.

In an aspect of the invention, there is a computer program product for triggering the uploading of video from a subset of cameras of a plurality of cameras implemented in a vehicle. The computer program product comprises a computer readable storage medium having program instructions embodied therewith, the program instructions executable by a computing device to cause the computing device to: monitor video or image data captured by the plurality of cameras; detect an anomalous event based on the monitoring of the video or image data, wherein the anomalous event relates to a collision, a road hazard, or an aggressive driver; determine a subset of cameras of the plurality of cameras that captured the video or image data associated with the anomalous event; and upload video captured by the subset of cameras of the plurality of cameras to a video storage server.

In an aspect of the invention, a system comprises: a CPU, a computer readable memory and a computer readable storage medium associated with a computing device; program instructions to monitor video or image data captured by a plurality of cameras implemented within a vehicle; program instructions to monitor vehicle information associated with the vehicle; program instructions to detect an anomalous event based on the monitoring of the video or image data and the monitoring of the vehicle information, wherein the detecting the anomalous event include detecting a satisfaction of criteria defining the anomalous event, wherein the anomalous event relates to a collision, a road hazard, or an aggressive driver; program instructions to determine a subset of cameras of the plurality of cameras that captured the video or image data associated with the anomalous event, wherein a field of view of the subset of cameras of the plurality of cameras face a direction associated with the anomalous event; and program instructions to upload video captured by the particular cameras of the plurality of cameras within a particular time window to a video storage server. The program instructions are stored on the computer readable storage medium for execution by the CPU via the computer readable memory

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
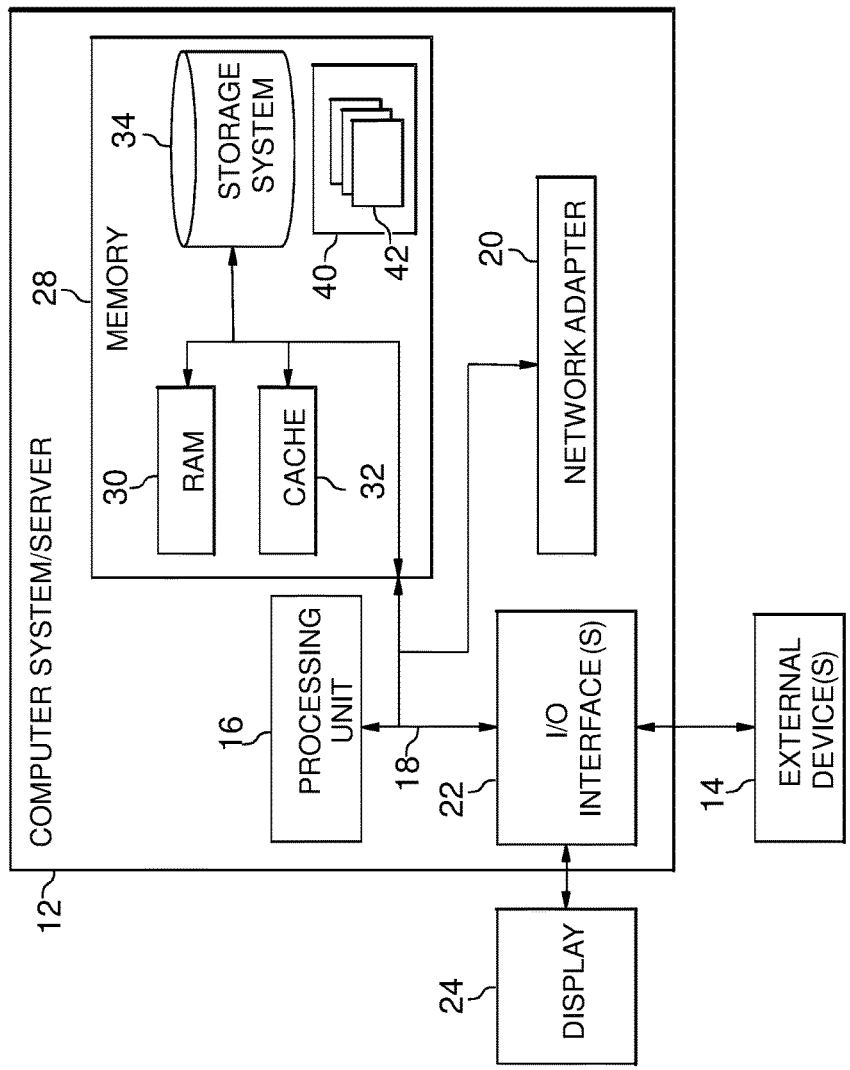
FIG. 1 depicts a cloud computing node according to an embodiment of the present invention.

The present invention generally relates to uploading video to a video storage server and, more particularly, to detecting events that trigger the uploading of video to a video storage server. Uploading video captured by vehicles (e.g., to a cloud server) may be useful to preserve video footage and to later analyze the video for various purposes (e.g., identifying road hazards, identifying at-fault drivers in an accident, etc.). Accordingly, vehicles may include a suite of cameras to capture video as the vehicle is being driven. However, uploading all video captured by vehicles while the vehicle is being driven can consume an inordinate amount of network resources and computer storage resources. Further, a vast majority of video may not be of interest to an end-user who may be only interested in a few seconds of video immediately prior to and/or immediately after a particular event. For example, a user may wish to view video captured by a vehicle at a small time window around the time when the vehicle experiences an anomaly (e.g., a tire puncture, an impact, engine malfunction, etc.). As another example, a user may wish to view a video at a small time window around the time when the video captures an anomalous event (e.g., an event of interest in which video of the event should be securely stored by a remote server for future analysis). For example, an anomalous event for which video may be uploaded and stored may include a traffic accident, bicycle accident, etc. Accordingly, aspects of the present invention may include systems and/or methods that detect the occurrence of a particular event (e.g., an anomalous event) and, in turn, upload a portion of the video at a particular time prior to the event and after the event to a cloud server for analysis. Further, the systems and/or methods may determine a particular direction in which video of interest has been captured.

As an example, the systems and/or methods may detect an event, such as a tire puncture (e.g., based on tire pressure sensors and a vehicle diagnostics system). Based on detecting the tire puncture, video captured by the vehicle's front-facing camera immediately prior to the tire puncture may be uploaded to the cloud server, since this video would show possible debris, potholes, etc., present on the road that would cause a tire puncture. Additionally, or alternatively, video captured by the vehicle's rear-racing camera after the tire puncture may be uploaded to the cloud server. In this way, the video may be analyzed to identify a road hazard (e.g., pot hole, debris, disabled vehicle, pulled over vehicle, etc.) that caused the tire puncture. Further, only video from them most pertinent angles from cameras that have predominantly captured an event would be uploaded to preserve network and storage resources.

As described herein, other events may trigger the uploading of video captured by a vehicle. For example, image analysis techniques may be used to detect an anomaly or risky situation based on the video captured by vehicle cameras. As an illustrative example, image analysis techniques may be used to detect a vehicle accident (e.g., a motor vehicle accident, a bicycle accident, etc.). Video from the particular camera(s) in the vehicle having a field of view facing the direction in which the anomaly was detected may then be uploaded to the cloud server. In this way, only video from cameras with fields of view facing in a direction that captured possible events of interest may be uploaded, thereby saving network and digital storage resources. Further, the uploaded video may be used to analyze incidents and conditions surrounding an event (e.g., the incidents/conditions leading up to a motor or non-motor vehicle accident, road hazard, etc.)

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example; the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set a east one) of program modules 42, may be stored in memory 28 by way of example, and not limitation, as well as an operating system one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
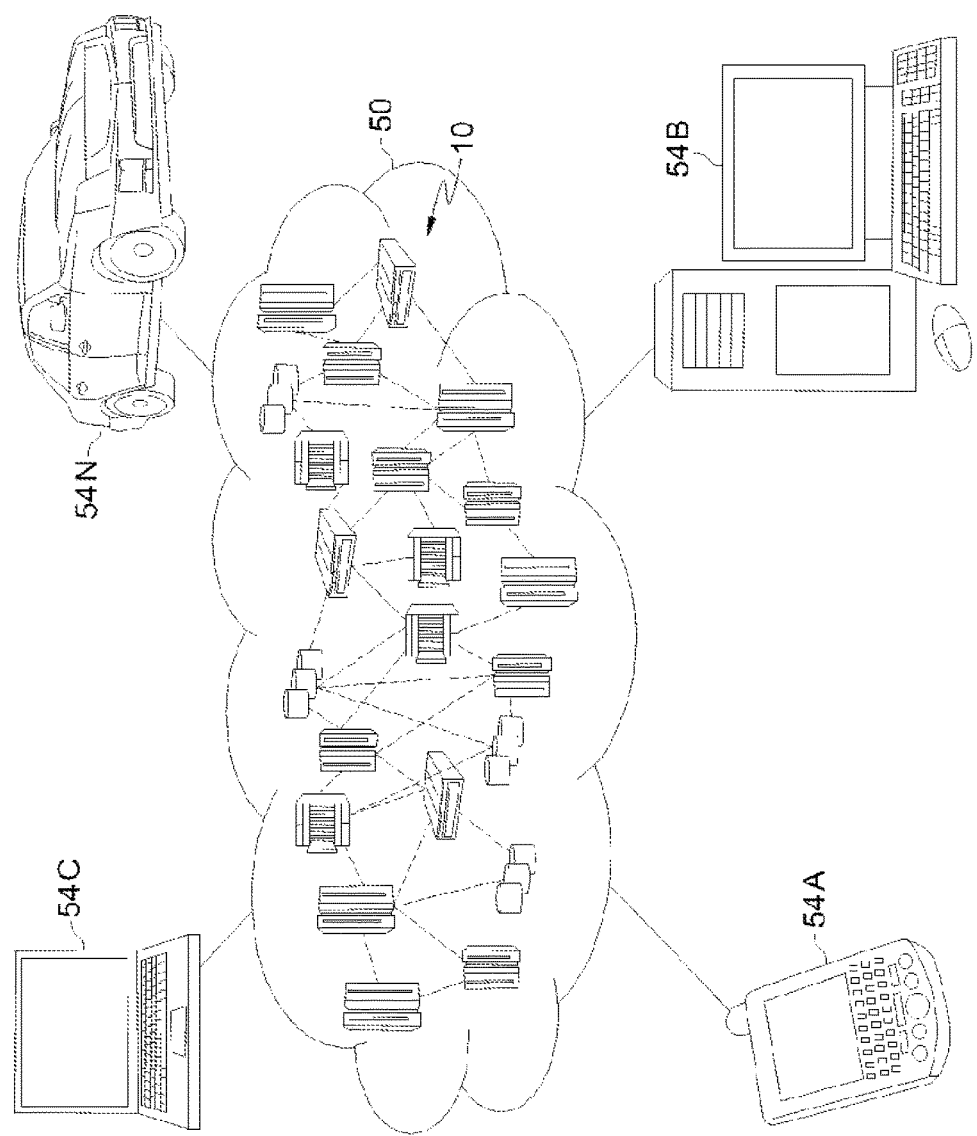
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to main am resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
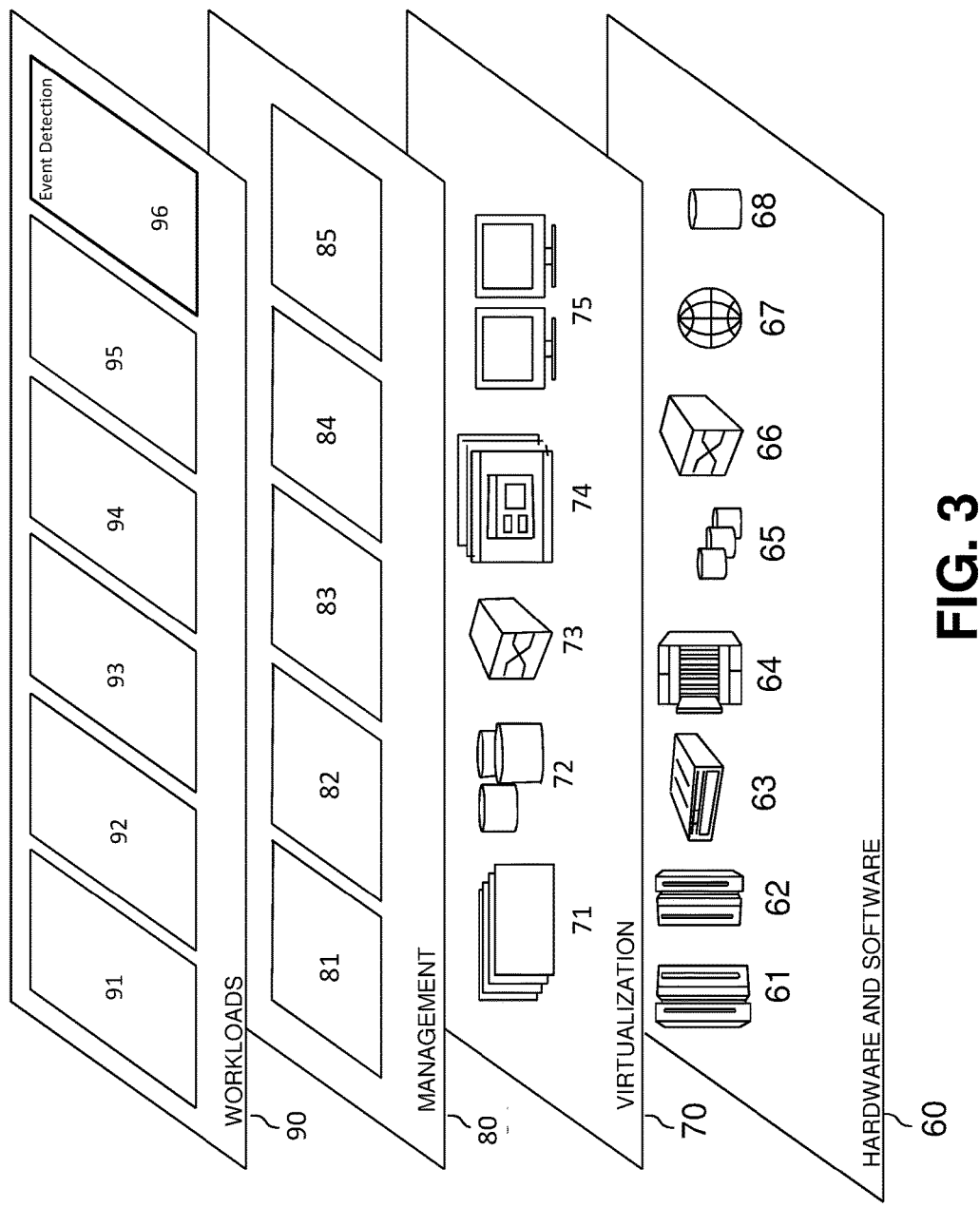
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event detection 96.

Referring back to FIG. 1, program/utility 40 may include one or more program modules 42 that generally carry out the functions and/or methodologies of embodiments of the invention as described herein (e.g., such as the functionality provided by event detection 96). Specifically, program modules 42 may monitor video and image data, monitor vehicle information, detect the satisfaction of particular video upload event criteria based on the monitoring, and upload video snippets to a video storage server based on detecting the satisfaction of video upload event criteria. Other functionalities of program modules 42 are described further herein such that program modules 42 are not limited to the functions described above. Moreover, it is noted that some of program modules 42 can be implemented within the infrastructure shown in FIGS. 1-3. For example, program modules 42 may be representative of an event detection component 415 FIG. 4.

Figure 4:
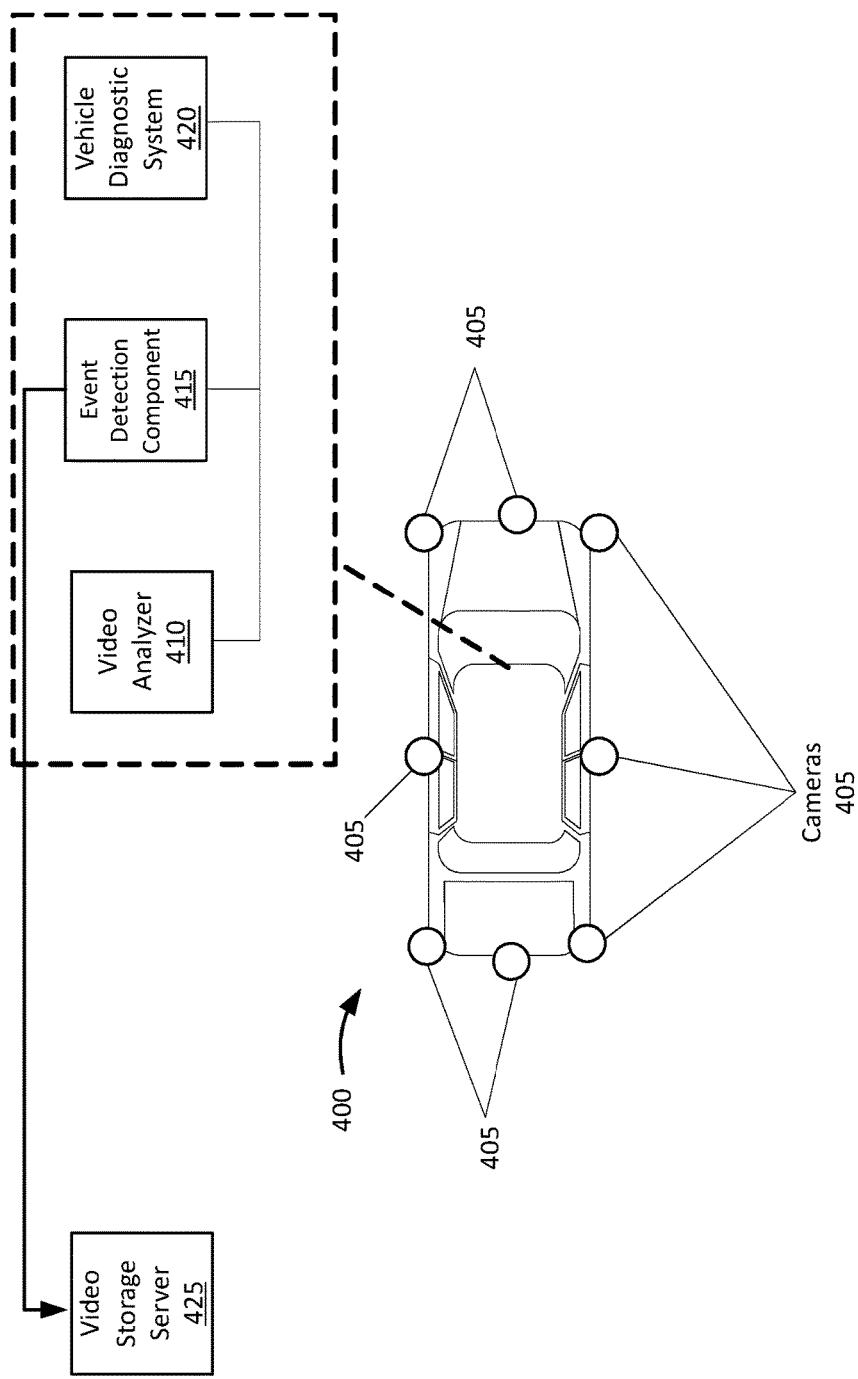
FIG. 4 shows an overview of an example implementation in accordance with aspects of the present invention

FIG. 4 shows an overview of an example implementation in accordance with aspects of the present invention. As shown in FIG. 4, a vehicle 400 may include a suite of cameras 405 that capture video from directions from the vehicle. For example, the vehicle 400 may include a front-facing camera, a rear-facing camera, side-facing cameras, diagonal-facing cameras, etc. During vehicle operation, vehicle 400 may record video using its cameras 405. As video is being recorded, a video analyzer 410 may provide video/image data to a video upload event detection component 415. The event detection component 415 may also communicate with a vehicle diagnostic system 420 that may provide vehicle diagnostic information to event detection component 415. For example, vehicle diagnostic system 420 may provide vehicle diagnostic information, such as tire pressure information, fluid level/temperature information, maintenance information, etc. Additionally, or alternatively, vehicle diagnostic system 420 may provide information from accident or impact sensors implemented in the vehicle 400. Based on the video/image data and/or the vehicle diagnostic information, event detection component 415 may detect the occurrence of an event in which video captured by the cameras 405 should be uploaded or provided to a video storage server 425.

In embodiments, event detection component 415 may detect an anomalous event (e.g., an unusual or high-risk event) from the video/image data and/or the vehicle diagnostic information. For example, event detection component 415 may identify objects and/or events from the video/image data (received from video analyzer 410) based on a stored set of rules that define the types of objects/events corresponding to the video/image data. As an example, event detection component 415 may store pixel-based classification rules that may be used to identify that a particular video or image includes an object of a damaged motor vehicle, damaged bicycle, or the like. The event detection component 415 may determine that a particular object or set of video/image data corresponds to an anomalous event based on the stored set of rules. In embodiments, event detection component 415 may further detect an anomalous event based on the vehicle diagnostic information (e.g., low tire pressures, impact on the vehicle, etc.).

Based on detecting the occurrence of an anomalous event, event detection component 415 may upload video from a particular time window (e.g., "snippet") surrounding the anomalous event (e.g., a particular amount of time before and/or after the event). For example, event detection component 415 may upload video from a local storage device implemented within the vehicle to video storage server 425. Further, event detection component 415 may upload the video only from the camera(s) facing a direction in which the event can be viewed. For example, if an event was detected based on video/image data from the front left camera 405, snippets from the front left camera 405 may be uploaded to video storage server 425. Alternatively, video snippets may be provided from multiple cameras 405 for certain event types.

As described herein, events may be categorized based on type (e.g., accident event, road hazard event, etc.) For example, event detection component 415 may store rules that identify particular vehicle diagnostic data and video/image data associated with a particular event type. In embodiments, video may be uploaded to different video storage servers 425 associated with different parties (e.g., based on the type of event). For example, events categorized as a road hazard (e.g., based on vehicle diagnostic data indicating a flat tire) may be provided to a video storage server 425 associated with an agency responsible for maintaining the road in which the hazard was present. As another example, events categorized as an accident (e.g., data from impact sensors and/or video/image data identifying damaged vehicles) may be provided to a video storage server 425 associated with a law enforcement agency, insurance company, roadside assistance company, news organization, traffic reporting organization, etc. Additionally, or alternatively, videos may be uploaded to a video storage server 425 associated with the driver. In embodiments, videos may be stored for a particular period of time after which time the videos may be automatically deleted (e.g., to make storage space available for additional incoming videos). As described herein, cameras 405, video analyzer 410, event detection component 415, vehicle diagnostic system 420, and/or video storage server 425 shown in FIG. 4 may include one or more of the components of computer system/server 12 of FIG. 1.

Figure 5:
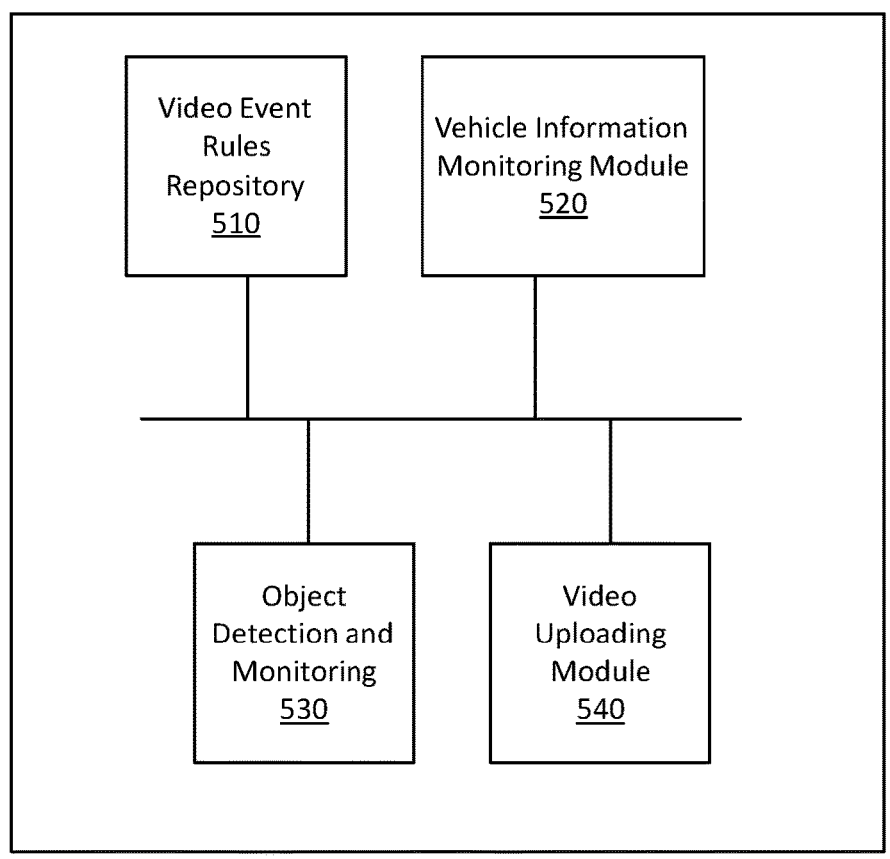
FIG. 5 shows a block diagram of example components of an event detect component in accordance with aspects of the present invention.

FIG. 5 shows a block diagram of example components of event detect component 415 in accordance with aspects of the present invention. As shown in FIG. 5, event detection component 415 may include a video event rules repository 510, a vehicle information monitoring module 520, an object detection and monitoring module 530, and a video uploading module 540. In embodiments, event detection component 415 may include additional or fewer components than those shown in FIG. 5. In embodiments, separate components may be integrated into a single computing component or module. Additionally, or alternatively, a single component may be implemented as multiple computing components or modules.

The video event rules repository 510 may include a data storage device (e.g., storage system 34 of FIG. 1) that stores a set of rules, definitions, or criteria defining events (e.g., anomalous events) based on vehicle data and/or video/image data. For example, the video event rules repository 510 may store pixel-based classification rules used to identify objects from video/image data. Further, the video event rules repository 510 may store rules that associate particular video/image criteria (e.g., objects, patterns, motions, etc.) to a particular event type (e.g., an anomalous event that triggers the upload of video to video storage server 425). The video event rules repository 510 may also store rules that identify event types based on other criteria, such as vehicle data (e.g., diagnostic data, such as tire pressure, vehicle impact data, etc.). The video event rules repository 510 may also store video uploading rules that identify particular cameras or a subset of cameras on vehicle 400 for which video should be uploaded to video storage server 425 (e.g., based on monitored data). The video event rules repository 510 may also store video uploading rules that identify threshold values for data reported by tire pressures or impact sensors that that trigger an event for which video should be uploaded. For example, video event rules repository 510 may store a rule to upload video from a subset of cameras when a tire pressure value drops below a threshold within a relatively short period of time, thus indicating a road hazard (e.g., a pothole or debris causing a flat tire when struck). Additionally, or alternatively, video event rules repository 510 may store a rule to upload video from a subset of cameras when a value for impact sensors exceeds a threshold, thus indicating a collision. Further, the video event rules repository 510 may store video uploading rules that identify particular time windows for video to upload (e.g., based on the type of event). In embodiments, rules stored by the video event rules repository 510 may be preconfigured, defined by authorities, user-configurable, and/or non-configurable.

The vehicle information monitoring module 520 may include a program module (e.g., program module 42 of FIG. 1) that monitors vehicle information (e.g., diagnostic information and/or sensor information from vehicle diagnostic system 420). For example, the vehicle information monitoring module 520 may monitor values reported by impact sensors, tire pressure sensors, and/or other types of sensors.

The object detection and monitoring module 530 may include a program module (e.g., program module 42 of FIG. 1) that detects and monitors surrounding objects from video captured by the cameras 405. In embodiments, the object detection and monitoring module 530 may detect objects based on pixel-based classification rules stored by the video event rules repository 510. Additionally, or alternatively, the object detection and monitoring module 530 may monitor motions for video captured by the cameras 405. In embodiments, the object detection and monitoring module 530 may receive video analysis data from video analyzer 410. For example, video analyzer 410 may analyze the video data to identify objects from video and image data, and provide information regarding the identified objects to the object detection and monitoring module 530. In embodiments, processes described as being performed by the object detection and monitoring module 530 may also be performed by video analyzer 410.

The video uploading module 540 may include a program module (e.g., program module 42 of FIG. 1) that detects the occurrence of an event and uploads video to video storage server 425 based on detecting the occurrence of an event (e.g., the satisfaction of criteria for rules stored by the video event rules repository 510). As described herein, the video uploading module 540 may detect the occurrence of an event when particular criteria for a rule has been satisfied or met (e.g., for rules stored by the video event rules repository 510). For example, the video uploading module 540 may detect the occurrence of an event based on detecting certain objects, object patterns, and/or motions (e.g., as monitored and detected by the object detection and monitoring module 530). Additionally, or alternatively, the video uploading module 540 may detect the occurrence of an event based on the satisfaction of criteria (e.g., satisfaction of threshold values) related to vehicle information (e.g., diagnostic information such as tire pressure, impact information reported by impact sensors of the vehicle, etc.). In other words, the video uploading module 540 may determine events and event types based on vehicle information (e.g., as monitored by the vehicle information monitoring module 520), objects and motion surrounding the vehicle (e.g., as detected and monitored by the object detection and monitoring module 530), and rules that define the criteria of the event types (e.g., as stored by the video event rules repository 510). In embodiments, video uploading module 540 may identify a subset of cameras that captured an anomalous event (e.g., cameras whose field of view faced a direction of the anomalous event).

As described herein, the video uploading module 540 may determine an event type based on the satisfaction of particular criteria associated with the event type. For example, the video uploading module 540 may determine a "road hazard" event type based on a sudden drop in tire pressure without other impacts to other parts of the vehicle (e.g., based on a rule that defines a road hazard as an event when there is a sudden drop in tire pressure without other impacts to other parts of the vehicle). As another example, the video uploading module 540 may determine a "surrounding vehicle accident" event type based on image/video data indicating that a surrounding vehicle became damaged or collided with another object (e.g., when a surrounding vehicle's body is intact and later shows sign of damage as determined by image/video analysis and classification techniques). For example, the "surrounding vehicle accident" event type may be determined based on a rule that defines the "surrounding vehicle accident" event type as an event in which a surrounding vehicle becomes damaged or collides with another object. As another example, the video uploading module 540 may determine a "surrounding non-motor vehicle accident" such as a bicycle accident (e.g., when image/video analysis and classification techniques detect a bicycle in a parallel orientation to the road). As another example, the video uploading module 540 may determine a "vehicle accident" when impact sensors of the vehicle in which event detection component 415 is implemented report impact measurements indicative of an accident or collision.

Additionally, or alternatively, the video uploading module 540 may determine other types of events based on rules that define the event types. For example, the video uploading module 540 may determine a "multicar accident" based on detecting objects, patterns, and motions indicative of a multicar accident. As another example, the video uploading module 540 may determine an "aggressive driving" event based on motion patterns of surrounding vehicles. As another example, the video uploading module 540 may determine a "disabled vehicle" or "stopped vehicle" event based on the presence of a stationary vehicle on a shoulder lane. As another example, the video uploading module 540 may determine a "hostile individual" event based on the an individual approaching a driver side of the vehicle while a driver is currently in the vehicle as identified by weight sensors implemented in the driver's side seat, etc.

As described herein, the video uploading module 540 may upload video to video storage server 425 based on detecting the occurrence of an event. In embodiments, the video uploading module 540 may determine a snippet or time window for video to upload (e.g., based on the determined event type). For example, for certain event types, the video uploading module 540 may upload video for a time window one minute prior to the event to one minute after the event. For another event type, the video uploading module 540 may upload video for a shorter true window (e.g., depending on the duration of the time window that is needed to analyze the preceding and surrounding incidents leading up to the detected event). In embodiments, the video uploading module 540 may upload video in a directionally intelligent manner in which only video captured by cameras 405 facing a direction that relevant to the event. In embodiments, the video uploading module 540 may upload video from a single camera 405 or multiple cameras 405 depending on the event type. Additionally, or alternatively, the video uploading module 540 may provide the video to different video storage servers 425 associated with different parties based on the event type. In embodiments, the video uploading module 540 may upload video as a computer file and may also attach metadata regarding the video (e.g., date/time of video capture, event type, vehicle owner information, registration information, license plate information, make/model, vehicle location based on global positioning system (GPS) data received by vehicle diagnostic system 420, etc.). In embodiments, the video uploading module 540 may provide video only, audio only, or both video and audio depending on the event type.

In embodiments, the video uploading module 540 may provide an indication regarding the event (without providing the video itself) to a server that maps and maintains information identifying road events, such as road hazards, accidents, etc. Further, the video uploading module 540 may provide an indication regarding the event to law enforcement and/or medical assistance personnel (e.g., to dispatch law enforcement to respond to an "emergency hostile individual" event when an aggressive individual is detected).

In embodiments, the video uploading module 540 may direct a display within the vehicle (e.g., associated with vehicle diagnostic system 420) to display an indication that an event has been detected and that video is being uploaded to video storage server 425. In embodiments, the video uploading module 540 may receive a manual instruction (e.g., via a physical button or via a user device) to upload video to video storage server 425. For example, a user or driver may select to upload video storage server 425 if the video uploading module 540 has not detected an event but if the user wishes to upload video. In embodiments, the video uploading module 540 may, over a period of time, learn the conditions of the vehicle surroundings in which a manual instruction is received to upload video. Further, the video uploading module 540 may create a new rule identifying the conditions so that events can be automatically detected in the future and video can be automatically uploaded.

Figure 6:
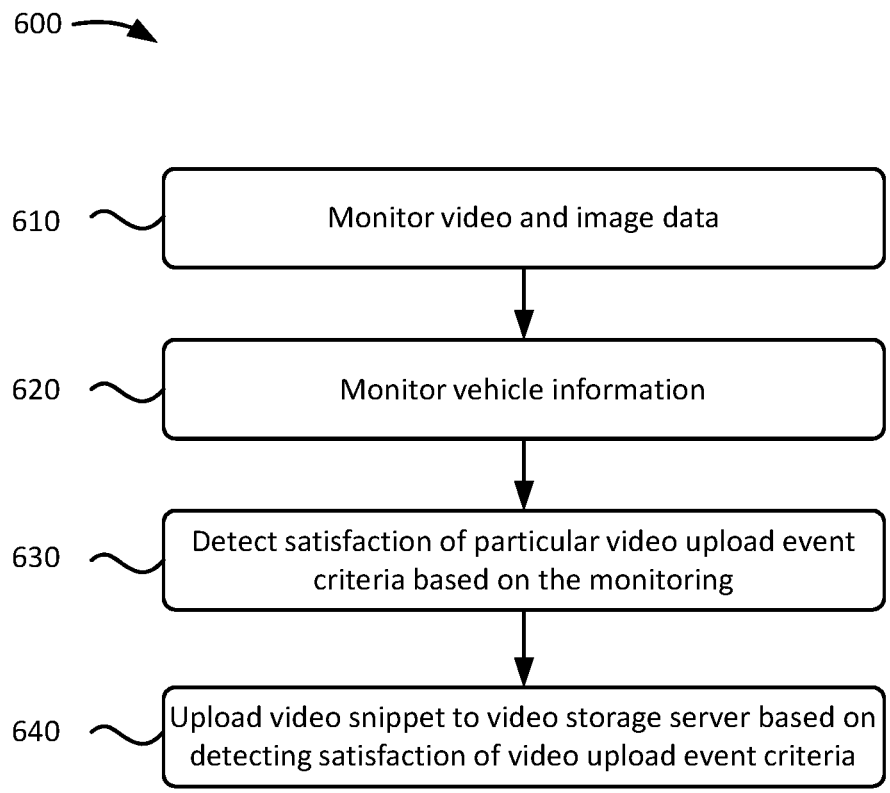
FIG. 6 shows an example flowchart for detecting an event to trigger uploading video to a video storage server in accordance with aspects of the present invention.

FIG. 6 shows an example flowchart for detecting an event to trigger uploading video to a video storage server in accordance with aspects of the present invention. The steps of FIG. 6 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 6, process 600 may include monitoring video and image data (step 610). For example, as described above with respect to the object detection and monitoring module 530, event detection component 415 may monitor video and image data captured by cameras 405 of a vehicle.

Process 600 may further include monitoring vehicle information (step 620). For example, as described above with respect to the vehicle information monitoring module 520, event detection component 415 may monitor vehicle information gathered and received by a vehicle diagnostic system 420.

Process 600 may also include detecting the satisfaction of particular video upload event criteria based on the monitoring (step 630). For example, as described above with respect to the video uploading module 540, event detection component 415 may detect the satisfaction of particular video upload event criteria based on the monitoring. As described above, event detection component 415 may detect that video/image data and vehicle diagnostic information meet particular criteria associated with a rule that defines an event and an event type. As described herein, different sets of criteria may define different events and event types, which in turn, defines time windows and particular cameras 405 for videos to upload. As described herein, the video upload event criteria may define an anomalous event (e.g., an event of interest in which video of the event should be uploaded to and securely stored by video storage server 425 for future analysis).

Process 600 may further include uploading a video snippet to a video storage server based on detecting the satisfaction of the video upload event criteria (step 640). For example, as described above with respect to the video uploading module 540, event detection component 415 may upload a video snippet to video storage server 425. In embodiments, event detection component 415 may determine a particular duration and time index for the video snippet, and may provide the video to different parties associated with different video storage servers 425 based on the event type. Further, event detection component 415 may determine particular cameras 405 for which video should be uploaded based on the video and image data that was used to detect the satisfaction of the video upload event. In other words, event detection component 415 may upload video captured by the cameras 405 that captured video of an anomalous event (e.g., video having objects, motions, or patterns that is defined as anomalous based on rules stored by the video event rules repository 510). For example, event detection component 415 may upload video captured by the cameras 405 that faced a direction of the anomalous event.

In embodiments, video snippets from surrounding vehicles may be uploaded. For example, when a event detection component 415 associated with a particular vehicle detects an event, event detection component 415 may communicate with event detection component 415 of other nearby vehicles (e.g., using standard language communication via a personal area network connection and/or other types of network connection) to direct event detection component 415 to upload videos from their respective vehicles' point of view. In this way, video from multiple vehicles may be uploaded for later analysis in the event only one vehicle's event detection component 415 detects an event but when video from other vehicle's points of view may be helpful in an analysis.

As described herein, video stored by video storage server 425 may be analyzed to better investigate the incidents that led up to a particular event (e.g., an accident, road hazard, aggressive driving, hostile activity, anomalous activity, etc.). The video may be used for a forensic analysis to investigate the event. Also, as discussed above, snippets of video are uploaded rather than all video captured by the cameras 405 to reduce storage and network resources. For example, video from the most pertinent angles may be provided such that full coverage of incidents leading up to an event may be stored by video storage server 425.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   monitoring, by a computing device, video or image data captured by a plurality of cameras implemented within a vehicle;
   monitoring, by the computing device, vehicle information associated with the vehicle, wherein the vehicle information includes sensor information reported by tire pressure sensors or impact sensors of the vehicle, or vehicle diagnostic information;
   analyzing, by the computing device, the monitored video or image data for objects, patterns, or motions within respective fields of view of the plurality of cameras;
   storing pixel-based classification rules in a memory of the computing device;
   storing video uploading rules that identify a subset of the plurality of cameras for which video should be uploaded in the memory of the computing device;
   detecting, by the computing device, satisfaction of video upload event criteria based on the analyzed monitored video or image data and the vehicle information, wherein the video upload event criteria identifies the subset of the plurality of cameras that captured video from a field of view facing an anomalous event defined by a particular set of objects, patterns, or motions, a rule to upload video from the subset of the plurality of cameras, and the stored pixel-based classification rules to identify the anomalous event from the video or image data;
   determining, by the computing device, the subset of the plurality of cameras based on the detecting the satisfaction of the video upload event criteria; and
   uploading, by the computing device, video captured by only the subset of the plurality of cameras to a video storage server.

2. The method of claim 1, further comprising determining an event type based on the satisfaction of the video upload event criteria, wherein the subset of the plurality of cameras are further determined based on the event type.

3. The method of claim 2, wherein the event type includes at least one of:
   a road hazard;
   a vehicle accident;
   a surrounding vehicle accident; and
   aggressive driving.

4. The method of claim 2, wherein the uploading the video includes uploading the video to a video server, wherein the video storage server is determined based on the event type.

5. The method of claim 2, wherein the uploading the video includes uploading metadata associated with the video, the metadata including: date and time of the video capture; the event type; vehicle owner information; registration information; license plate information; vehicle make and model; and vehicle location based on global positioning system (GPS) data received by vehicle diagnostic system; and
   wherein the plurality of cameras implemented within the vehicle includes: a front-facing camera; a rear-facing camera; side-facing cameras; and diagonal-facing cameras, all of which capture video while the vehicle is being driven.

6. The method of claim 1, wherein the uploading the video includes uploading a particular snippet of video for a time window.

7. The method of claim 6, wherein the time window is determined based on satisfaction of the video upload event criteria.

8. The method of claim 1, wherein the monitoring the video or image data includes detecting objects, motions, or patterns based on the pixel-based classification rules, and further comprising:
receiving, by the computing device, manual instruction to upload video captured by the plurality of cameras to a video storage server;
creating, by the computing device, a new rule based on the receiving the manual instruction;
automatically detecting, by the computing device, another event based on the new rule; and
automatically uploading, by the computing device, video data based on the automatically detecting.

9. The method of claim 1, wherein the detecting the satisfaction of the video upload event criteria includes detecting that a value for the tire pressures or impact sensors satisfies a threshold.

10. The method of claim 1, wherein a service provider at least one of creates, maintains, deploys and supports the computing device.

11. The method of claim 1, wherein steps of claim 1 are provided by a service provider on a subscription, advertising, and/or fee basis.

12. The method of claim 1, wherein the computing device includes software provided as a service in a cloud environment.

13. The method of claim 1, further comprising deploying a system for triggering the uploading of video, comprising providing a computer infrastructure operable to perform the steps of claim 1.

14. A computer program product for triggering the uploading of video from a subset of cameras of a plurality of cameras implemented in a vehicle, the computer program product comprising a computer readable storage medium having program instructions embodied therewith, the program instructions executable by a computing device to cause the computing device to:
monitor video or image data captured by the plurality of cameras;
analyze the monitored video or image data for objects, patterns, or motions within respective fields of view of the plurality of cameras;
store pixel-based classification rules in the computer readable storage medium;
store video uploading rules that identify a subset of the plurality of cameras for which video should be uploaded in the computer readable storage medium;
detect an anomalous event using the analyzed monitored video or image data and the stored pixel-based classification rules to identify the anomalous event from the video or image data, wherein the anomalous event is defined by a particular set of objects, patterns, or motions and relates to a collision or a road hazard;
determine the subset of cameras of the plurality of cameras that were used to detect the anomalous event and that captured the video or image data having objects, patterns, or motions consistent with the anomalous event and captured from a field of view facing and associated with the anomalous event; and
upload video captured by only the subset of cameras of the plurality of cameras to a video storage server.

15. The computer program product of claim 14, wherein a field of view of the subset of cameras face a direction of the anomalous event.

16. The computer program product of claim 14, wherein the program instructions further cause the computing device to monitor vehicle information from a vehicle diagnostic system, wherein the vehicle information includes sensor information reported by tire pressure sensors or impact sensors of the vehicle, or vehicle diagnostic information,
wherein determining the subset of cameras of the plurality of cameras is further based on the monitoring of the vehicle information.

17. The computer program product of claim 14, wherein the program instructions further cause the computing device to determine an event type associated with the anomalous event based on the monitoring of the video or image data, wherein the determining the subset of cameras of the plurality of cameras is further based on the event type.

18. The computer program product of claim 17, wherein the uploading the video captured by the subset of cameras of the plurality of cameras of the plurality of cameras includes uploading video from a particular time window, wherein the particular time window is based on the event type.

19. A system comprising:
a CPU, a computer readable memory and a computer readable storage medium associated with a computing device;
program instructions to monitor video or image data captured by a plurality of cameras implemented within a vehicle;
program instructions to analyze the monitored video or image data for objects, patterns, or motions within respective fields of view of the plurality of cameras;
program instructions to monitor vehicle information associated with the vehicle;
program instructions to store pixel-based classification rules in the computer readable memory;
program instructions to store video uploading rules that identify a subset of the plurality of cameras for which video should be uploaded in the computer readable memory;
program instructions to detect an anomalous event using the analyzed monitored video or image data and the monitored vehicle information using the stored pixel-based classification rules to identify the anomalous event from the video or image data, wherein the detecting the anomalous event includes detecting a satisfaction of criteria defining the anomalous event, wherein the anomalous event is defined by a particular set of objects, patterns, or motions and relates to a collision or a road hazard;
program instructions to determine the subset of the plurality of cameras of the plurality of cameras that were used to detect the anomalous event and that captured the video or image data having objects, patters, or motions consistent with the anomalous event and captured from a field of view facing and associated with the anomalous event; and
program instructions to upload video captured by only the subset of cameras of the plurality of cameras within a particular time window to a video storage server,
wherein the program instructions are stored on the computer readable storage medium for execution by the CPU via the computer readable memory.

20. The system of claim 19, further comprising program instructions to direct a computing device from a surrounding vehicle to upload video captured by one or more cameras implemented in the surrounding vehicle to the video storage server.

* * * * *